United States Patent [19]

Khalil et al.

[11] Patent Number: 5,183,581
[45] Date of Patent: Feb. 2, 1993

[54] PROCESS FOR THE DEWAXING OF PRODUCING FORMATIONS

[75] Inventors: Carlos N. Khalil; Régis K. Romeu, both of Rio de Janeiro; André Rabinovitz, Bahia, all of Brazil

[73] Assignee: Petroleo Brasileiro S.A., Rio de Janeiro, Brazil

[21] Appl. No.: 693,472

[22] Filed: Apr. 13, 1992

[30] Foreign Application Priority Data

Aug. 24, 1990 [BR] Brazil ................ PI BR 9004200

[51] Int. Cl.$^5$ ................ E21B 43/25; E21B 43/28
[52] U.S. Cl. ................ 252/8.552; 134/40; 166/304; 507/90
[58] Field of Search ............ 252/8.552, 8.3; 166/303, 304, 309; 134/40

[56] References Cited

U.S. PATENT DOCUMENTS

| | | | |
|---|---|---|---|
| Re. 30,935 | 5/1982 | Richardson et al. | 166/309 |
| 2,817,635 | 12/1957 | Goldman et al. | 252/8.552 |
| 2,836,559 | 5/1958 | Bock et al. | 252/8.552 |
| 3,279,541 | 10/1966 | Knox et al. | 166/304 X |
| 3,437,146 | 4/1969 | Everhart et al. | 166/303 |
| 4,207,193 | 6/1980 | Ford et al. | 252/8.552 |
| 4,289,633 | 9/1981 | Richardson et al. | 252/8.551 |
| 4,330,037 | 5/1982 | Richardson et al. | 166/303 X |
| 4,380,268 | 4/1983 | Martin | 166/304 |
| 4,399,868 | 8/1983 | Richardson et al. | 166/304 X |
| 4,614,236 | 9/1986 | Watkins et al. | 166/304 |
| 4,737,296 | 4/1988 | Watkins | 252/8.553 |
| 4,755,230 | 7/1988 | Ashton et al. | 252/8.3 |
| 4,775,489 | 10/1988 | Watkins et al. | 252/8.552 |
| 4,848,277 | 7/1989 | Bommer | 122/20 B |

FOREIGN PATENT DOCUMENTS 1264413 1/1990 Canada.

OTHER PUBLICATIONS

N. F. Carnahan, *Journal of Petroleum Technology*, Oct. 1989, pp. 1024–1025.
G. Broaddus, *Journal of Petroleum Technology*, Jun. 1988, pp. 685–687.
M. Primeaux, *Petroleum Engineer International*, Jun. 1989, pp. 17–18.
Straub et al., *SPE Paper No.* 18889, Mar. 1989.
K. M. Barker, *SPE Paper No.* 16230, Mar. 1987.
J. P. Ashton et al., *SPE Production Engineering*, May 1989, pp. 157–160.

*Primary Examiner*—John S. Maples
*Assistant Examiner*—C. Sayala
*Attorney, Agent, or Firm*—Sughrue, Mion, Zinn, Macpeak & Seas

[57] ABSTRACT

A process, based on the Nitrogen Generating System/Emulsion in the presence of organic solvents, which is useful for the dewaxing of producing formations, is disclosed. The heat generation with the nitrogen reaction system and organic solvents gives rise to a thermochemical, synergistic system for long lasting removal of paraffinic damage, oil production rates being restored and even increased. The process is relatively easy to implement and of low cost.

8 Claims, 3 Drawing Sheets

PROCESS FOR THE DEWAXING OF PRODUCING FORMATIONS

TECHNICAL FIELD

This invention relates to a process for the dewaxing of producing formations. More specifically, the present invention relates to a process for the dewaxing of formations by means of the injection of a nitrogen generating solution emulsified in an organic solvent.

BACKGROUND OF THE INVENTION

Paraffin (wax) deposition is found practically whenever oil is produced and transported, causing damage and therefore lowering production.

Paraffin deposits are typically made up of linear, saturated hydrocarbon chains ($C_{16}$ to $C_{80}$) admixed to branched hydrocarbons, asphaltenes, water and inorganic compounds such as sand, rust, iron sulfide, clays, etc. The deposit hardness depends chiefly on the oil amounts and mineral substances present in the mixture.

The phenomenon of the deposition or precipitation of solid wax constitutes an example of fluid/solid phase equilibrium, which is explained in the light of solution thermodynamics principles, that is, the solution of a higher molecular weight hydrocarbon in lower molecular weight hydrocarbons which function as solvents. That is, high molecular weight solids precipitate whenever is reduced the transport ability of the fluid solvent.

Wax precipitation is gradual, leading to different chain lengths according to the depth of the paraffin deposit-containing well. The wax deposition mechanism depends on pressure and temperature. Generally, lower pressures tend to increase the cloud point temperature. The cloud point temperature range of several waxy crudes is such that the wax can precipitate even on the formation face as well as within the formation throughout the pressure reduction phenomenon which normally occurs during the well useful life. The lowering in production rate can be wrongly attributed to the reservoir depletion, while many times it is due to the formation permeability reduction and/or to the diameter of the production string.

Hydrocarbon chains of different lengths are present in varying percentages as well as melting points, becoming insoluble at different temperatures. Organic solvents like hot xylene are able to dissolve paraffins and asphaltenes, but not the inorganic deposits; on the other hand, asphaltenes are insoluble in hot pentane.

Removal of the paraffinic deposit is effected through three main methods: thermal, mechanical and chemical, mechanical methods being used specially for production strings and conduits.

The main known thermal method employs heated oil, pumped through the annulus in order to remove the paraffin. This method can be safely used only when paraffin is deposited above the perforations, since heated crude oil can carry paraffin inside the formation where it can cool and settle in the porous spaces.

One alternative to hot oiling is hot water, the higher thermal content of which being able to melt paraffins, although at high cost; besides, hot water does not dissolve nor dilutes the paraffin and can cause emulsion and corrosion problems as well as swelling of a few clayminerals present in the formation. However, paraffin deposits can be chemically dispersed by hot water.

In the mechanical methods, paraffin is physically removed from the wall surface. Surface agents and solvents aid in the removal, paraffin being dispersed in solution.

In the absence of the combined use of solvent and/or dispersants, thermal and mechanical methods simply displace paraffins, where they can cause another problem. Only chemical methods can dissolve or disperse paraffin deposits in oil. Normally, chemical removal is effected through the aid of solvents or surface agents. Paraffinic solvents dissolve deposits; their action is, however, limited to the deposit surface, while surface agents lower surface tension and chemically wrap small particles, thus changing their mutual adhesion capacity, or their adhesion to tubing (pipe) surfaces. Thus the smaller paraffin particles keep oil-suspended and move freely. The presence of a surface agent lowers the water surface tension breaking the link between paraffin molecules and the tube metallic wall, avoiding further paraffin deposition, therefore acting secondarily as a preventive method. Normally, surface agents are diluted in solvents, aqueous or not, and injected in the area showing damage caused by paraffin deposition.

PRIOR ART

Basic information on the problem of paraffin deposition in oil wells can be found in the articles by N. F. CARNAHAN, "Paraffin Deposition in Petroleum Production"—Journal of Petroleum Technology, October 1989, p. 1024-25; G. BROADDUS—"Well and Formation Damage Removal with Non-Acid Fluids", Journal of Petroleum Technology, June 1988, p. 685-87; M. PRIMEAUX,—"Control Paraffin Buildup with Chemical Prevention Programs", Petroleum Engineer International, June 1989, p. 17-18; T. J. STRAUB et al.,—'An Investigation into Practical Removal of Downhole Paraffin by Thermal Methods and Chemical Solvents", SPE paper No. 18889, March 1989; K. M. BARKER,—"Formation Damage Related to Hot Oiling", SPE Paper No. 16230, March, 1987.

U.S. Pat. No. 3,437,146 relates to a process for removing paraffin deposits from a producing well which comprises the injection of hot xylene solvent in the well borehole such as the solvent be at least at 65° C. when it contacts the producing formation and thereafter, withdraw the solvent and dissolved paraffin.

U.S. Pat. No. 4,380,268 relates to a process for stimulating gas and oil wells and removing paraffin from a well which comprises injecting in the well a polymer from a primary alcohol and ethylene oxide (ethoxylated fatty alcohol) in an aqueous fluid. The increase in production obtained from the use of the dewaxing detergent is claimed as being generally higher than 500%.

A paper by J. P. Ashton et al., entitled "In Situ Heat System Stimulates Paraffinic Crude Producers in Gulf of Mexico", in SPE Production Engineering, May 1989, p. 157-160, describes the thermal stimulation of wells in order to remove the paraffinic damage through the heat generation caused by an exothermic chemical reaction, in aqueous phase, the temperature of the formed brine reaching up to 120° C. The reaction rate is controlled to generate pre-determined amounts of heat at a previously established well depth. The injection of hot brine in the producing formation creates a heated region around the well perforations. The radial extension of the heated region is a function of the injected heated brine volume. As heat is transferred through vertical conduction through the perforated interval, formation areas of low permeability are equally heated. The exothermic reaction employs sodium nitrite and ammonium nitrate in aqueous solution, the reaction products being nitrogen, water and sodium nitrate. The resulting brine is not considered to be deleterious to the formation. The reaction occurs as soon as the forming salts are mixed, in the presence of HCl as catalyst, the control of the reaction being done by buffering the pH of the solution in the range of from 5.0 to 8.0. The reaction is faster at a lower pH. Control is effected such that the reaction begins gradually and progresses slowly as the solution is displaced throughout the production string at constant rate. Nearly 61 meters above the perforations, the reaction rate increases and produces huge amounts of heat, the temperature reaching a thermal maximum, heat being lost to the environment, with consequent reduction in the temperature of the spent solution.

However, the described process presents limitations due to the fact that it is limited to non-calciferous formations, since that kind of formations could react with the HCl catalyst. According to the disclosed process, maximum exothermicity occurs in the production string. Another drawback is that paraffin displacement, instead of paraffin withdrawal, can occur. Production profiles shown in the cited paper indicate that the proposed treatment should be repeated every two or three months, due to damage to the formation caused by new paraffin deposits, the production being reduced consequently.

U.S. Pat. No. 4,775,489 discloses a foamed oil in water emulsion, which contains a water immiscible organic solvent for paraffins and asphaltenes, an aqueous component which is non deleterious to the formation, an inert gas and surface agents selected to promote a foamed emulsion which is stable in spite of the contact of the treating fluid with the hydrocarbon and aqueous environment in the reservoir.

Canadian Patent CA 1,264,413 discloses the removal of paraffinic deposits from subterranean locations which comprises preparing a foamed emulsion outside the subterranean location, and injecting the emulsion as a foam into the well bore. The emulsion comprises an organic solvent for paraffins, an aqueous liquid component, an inert gas, and a surface agent.

U.S. Pat. No. 4,775,489 as well as Canadian Patent 1,264,413 do not employ the in situ nitrogen gas and heat generation, as is the case of the present invention.

Therefore, the technique of stimulation of producing formations through removal of paraffinic damage still needs to be improved in order to effect a more lasting stimulation of the producing formations, oil production being consequently increased and this, independently of the presence or not of calciferous cements.

Thus, one objective of the present invention is to present a process for the stimulation of formations through the generation of heat from the reaction of two inorganic salts, in the presence of an organic solvent with removal of the paraffinic damage through a thermo-chemical system.

Another objective is to disclose a process for stimulating formations through an water-in-oil emulsion where the organic solvent is selected as a function of its capacity of reducing the pour point of the oil and/or paraffin.

Still another objective is to provide a system for damage removing from the formation with maximum profit of the production of gas and heat in the formation, through the temporary stabilization of the emulsified fluid during its pumping, besides ease of recovery of the energized fluid after the completion of the treatment.

A further objective is the paraffin removal, and not only its displacement from the reservoir, by combining the presence of organic solvent in the emulsion external phase, together with the increase in temperature.

SUMMARY OF THE INVENTION

The stimulating process of the present invention is done by the association of thermal (heat generation), fluid-dynamic (nitrogen generation) and dissolution (presence of organic solvents) effects, through a set of operation conditions which is different and novel as related to all other systems presently known.

Nitrogen generation basically employs the Nitrogen Generation System (NGS) as previously described by the Applicant in Brazilian Application PI 8702856, which is now U.S Pat. No. 4,848,277, the content of which is hereby fully incorporated as reference. In the present application, the NGS is emulsified in an organic solvent, so that by combining thermal, fluid-dynamic and dissolution effects, be reached the definitive removal of the paraffinic damage to the formation, as well as the increase and stabilization of oil production at levels superior even to those obtained in the beginning of the production, when, at least in theory, there was no damage.

Basically, the dewaxing process of the present invention consists in treating the producing interval with the NGS/emulsion fluid pumped at low rate followed by shutting the well during a certain period of time and finally recovering the spent fluid. Monitoring of the production and properties of the oil produced before and after the stimulation operation evaluates the performance of the dewaxing process. Chromatographic profiles of oil produced before and after the operation point to removal of heavy fractions deposited in the reservoir throughout its productive life.

The choice of the organic solvent or mixture of organic solvents is made according to analyses results on the constituents of the paraffinic damage, such as to select the solvent, or mixture of solvents, which could attain maximum dissolution of the paraffinic damage.

Generally, 30 to 50% by volume of organic solvent are employed, admixed to 70% to 50% of nitrogen generating solution. A single solvent, or a mixture of solvents can be employed, for example, pure kerosene, or kerosene admixed to xylene. Normally, a mixture of aliphatic and aromatic solvent is preferred. A small portion of surface active agent, e.g., between 0.2 and 1.0% by volume of the total fluid is also present.

PREFERRED EMBODIMENTS

Nitrogen generation is carried out through the reaction between ammonium and nitrite ions present in an aqueous solution of these salts, nitrogen gas and heat resulting from the reaction. The aqueous nitrogen generating solution contains: a compound bearing at least one nitrogen atom to which is attached at least one hydrogen atom, this compound being able of being quickly and exotermally oxidised, in acid aqueous solution, thus producing heat, nitrogen gas and by-products which are liquid or dissolved, while being substantially inert to the well pipes as well as to the reservoir constituents; b) at least one oxidizing agent which is able to oxidize the nitrogen compound of a); c) a buffer system which is able to keep the solution pH at a level comprised around 5.0 or less.

Among the various oxidation-reduction couples of the a)-b) kind which can be used, one can cite: urea-sodium hypochlorite, ammonium hydroxide-sodium hypochlorite, urea-sodium nitrite, and ammonium chloride-sodium nitrite, this last one being used in the present process, since it shows easy control of the reaction kinetics, a strong exotherm and sensitivity to the pH as well as to the temperature.

The buffer system c) is made up of acetic acid 96% by volume.

The water employed in the dissolution of the nitrogen reagents is any good quality, industrial water, free of contaminants such as mineral acid, alcohol, alcalies, dichromates and trivalent iron salts. The sodium nitrite solution should be free of strong acid which could generate nitrous acid, which decomposes into nitrous oxide, of irritating smell. The ammonium chloride solution should be free of alkaline compounds in order to avoid ammonia release.

The reaction between the nitrogen generating compounds comprehends the steps of reagent dissolution, $NH_4NO_2$ complex formation, and further dissolution of the complex into nitrogen and water. The acid hydrogen $H^+$ species acts during the active complex step, so that the optimum operation pH should be determined, its value in this case being comprised between 4.5 and 5.8. Thermally, dissolution of the reagents in water is endothermic while nitrogen generation is strongly exothermic, nearly 70-75 kcal per mol of reagents being released, the strong exotherm being extremely useful in the process of paraffinic damage removal.

The desired thermal effect is obtained by mixing the reagents in varying molar amounts, according to the need of the interval to be treated, being for example comprised between 5 to 9M sodium nitrite and 4 to 6M ammonium chloride, provided that the molar ratio of the oxidation-reduction couple be always kept at 1/1 (equimolar).

Calculations for the establishment of fluid required volumes takes into account the well geometry, the producing interval, the fluid expansion ability as well as its thermal capacity, and the thermal and chemical behavior of the oil and/or paraffinic deposit.

Therefore, the formation dewaxing process of the present invention, developed by the Applicant with reference to FIG. 1, is characterized in that it comprises the steps of:

a) preparing an aqueous solution of $NH_4Cl$ having a concentration of from 2.0 to 6.0M;

b) preparing an aqueous solution of $NaNO_2$ having a concentration of from 5.0 to 9.0M;

c) preparing a mixture of organic solvents suitable for the hot dissolution of the paraffinic damage;

d) adding an emulsifier to the mixture of organic solvents so as to obtain a concentration of 0.6 to 2% by volume of emulsifier in the mixture;

e) adding acetic acid 96% to the $NH_4Cl$ solution;

f) adding 50% of the amulsified organic solvents mixture of step d) to the $NH_4Cl$ solution and 50% of the said mixture to the $NaNO_2$ solution, thus forming respectively a $NH_4Cl$ emulsion and a $NaNO_2$ emulsion, both emulsions being kept under agitation;

g) simultaneously pumping into the well the emulsified $NH_4Cl$ and $NaNO_2$ solutions whereby an equimolar amount mixture of $NH_4Cl$ and $NaNO_2$ is formed, thus initiating an equimolar reaction between the constituents of the nitrogen and heat generating mixture, while the pH of the mixture is kept between 4.5 and 5.8;

h) after having pumped the treating fluid, displace it from the well by means of an aqueous saline fluid (overflush).

BRIEF DESCRIPTION OF THE DRAWINGS

The basic flowsheet for the operation of the present invention is illustrated in FIG. 1, which is a block diagram of the preferred embodiment of same, as described hereinbefore.

Figure 1:
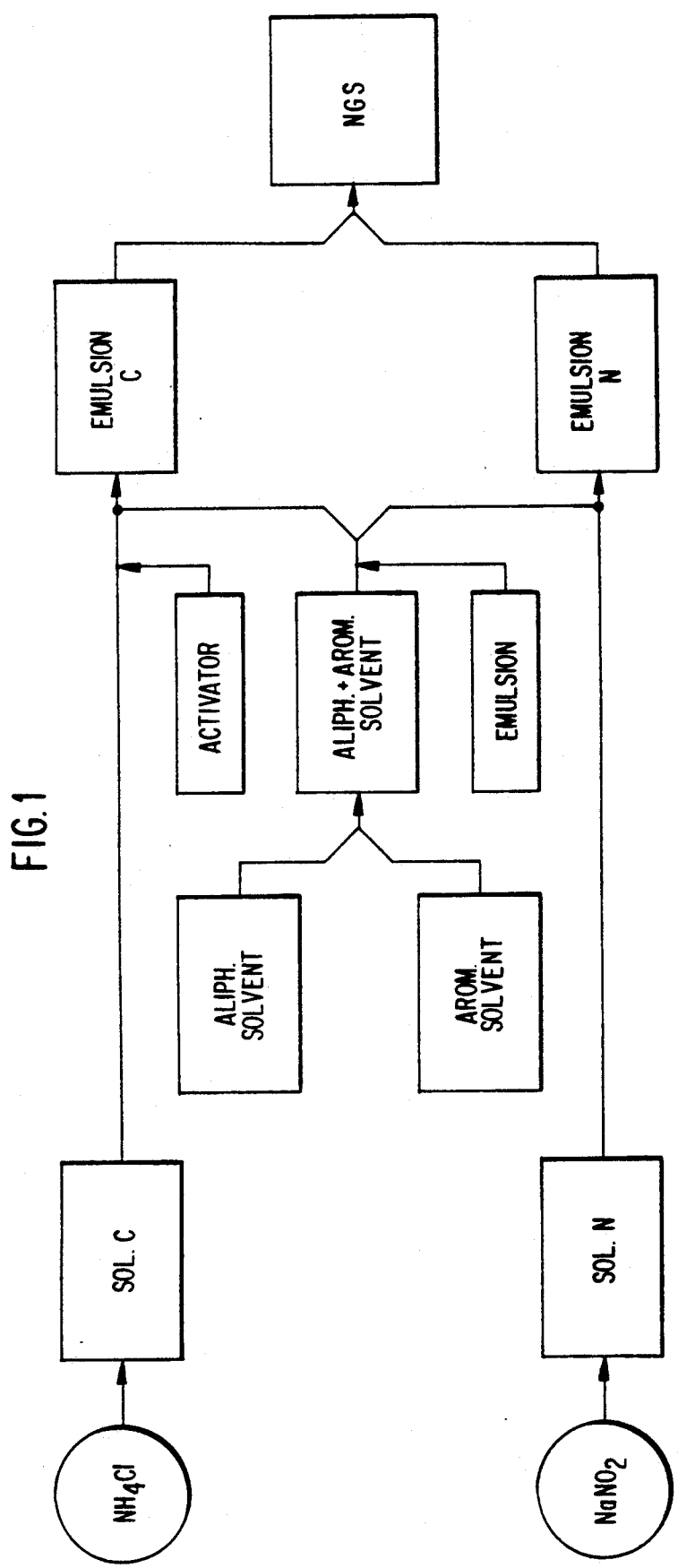
Figure 2:
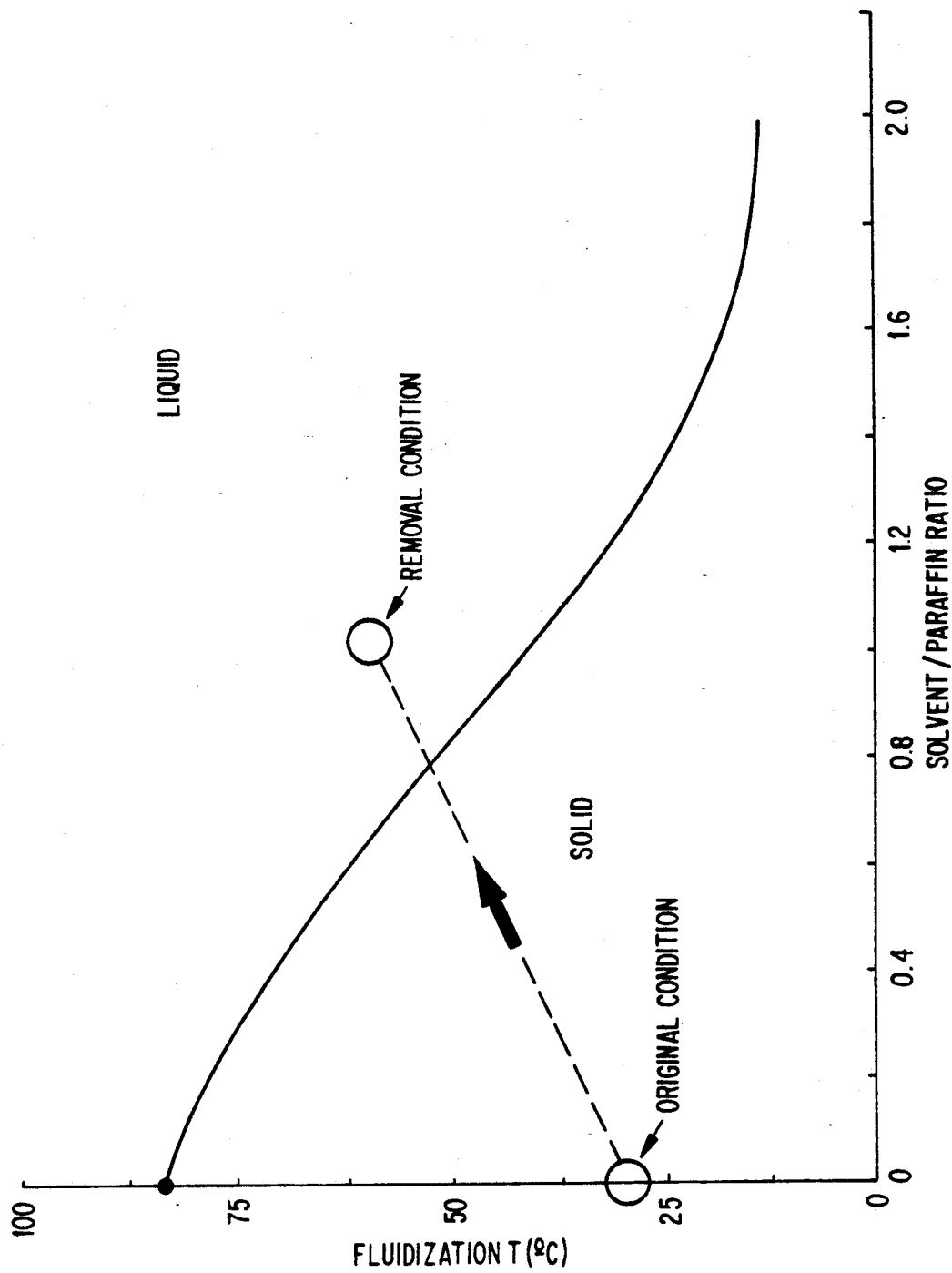
FIG. 2 illustrates the dependence of the paraffinic deposit pour point on the amount of added solvent. The curve pour point sets the border between the solid and liquid states in the domain temperature vs. solvent.
Figure 3:
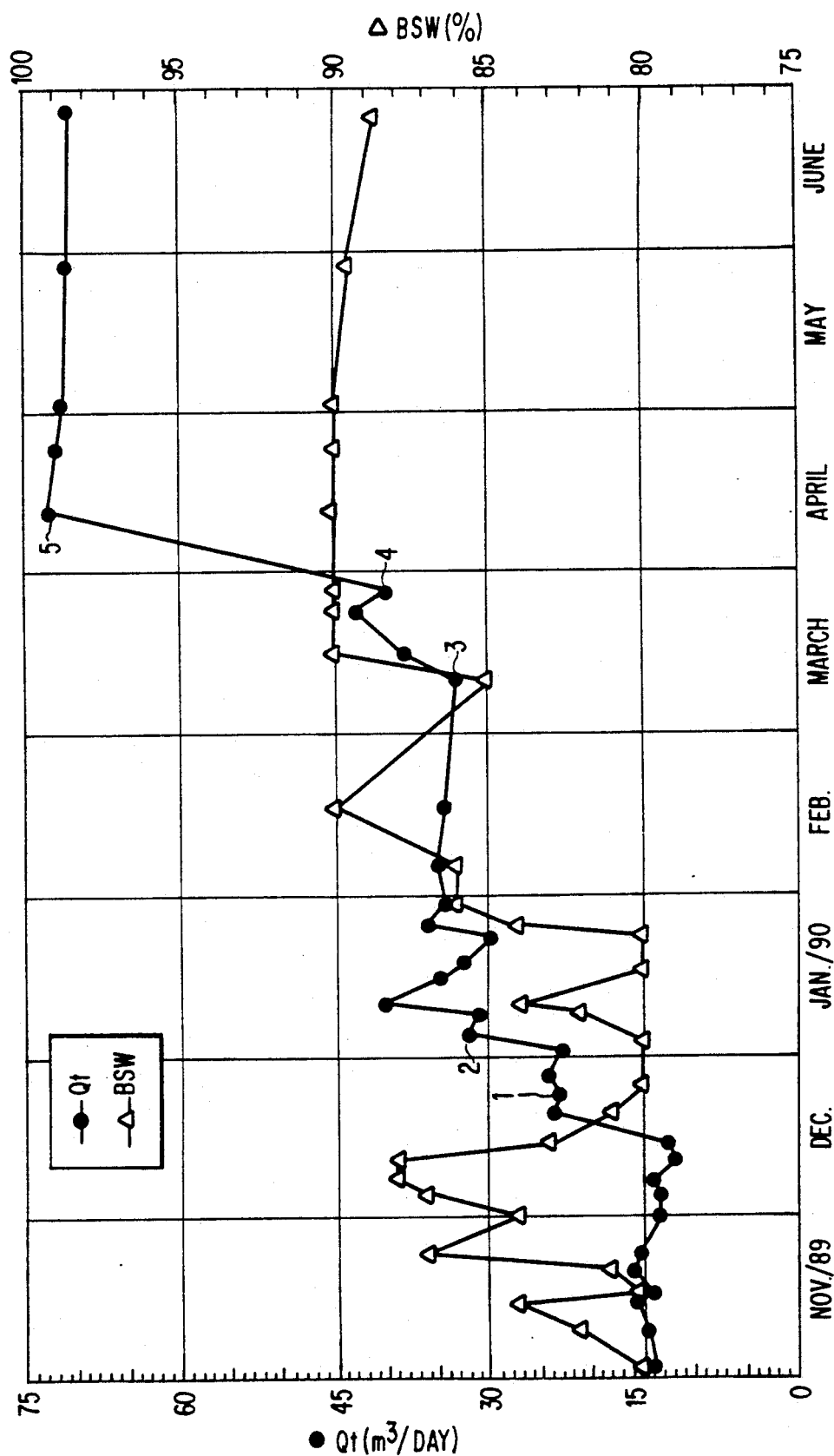
FIG. 3 illustrates the flow rate and BSW value as a function of time. Point 1 indicates the point of injection of the present invention treating fluid; 2 is the path change of the pumping unit; 3 is the change in cycles per minute (CPM) of the pumping unit and 4 is the pumping unit exchange for a more powerful one.

In the effective working of the present invention, calculations on the operation dimensioning are required, while taking account of the cited parameters, such as the well geometry, the producing interval, the fluid expansion and thermal capacity, besides the oil thermal and chemical behavior.

A typical dewaxing operation according to the present invention involves a pre-flush step in order to displace and/or force the oil well and test the injectivity; during this step jet fuel is a proper solvent, used in a volume of 7.2 $m^3$ (45.4 bbl). Following, is injected the main fluid to treat the producing interval with NGS/emulsion in order to remove the paraffinic damage. In a specific embodiment, the volume used reached 15.1 $m^3$ (95 bbl). After the treating fluid injection, said fluid is displaced by means of 1.1 $m^3$ (7.2 bbl) of jet fuel, this volume being equivalent to the volume of the production string.

In a study of operation dimensioning, a fluid of the following composition was employed where NGS was emulsified with organic solvent: 35% by volume of the $NH_4Cl$ 5M solution, 35% by volume of the $NaNO_2$ 5M solution, 21% benzene, 9% xylene and 0.6% emulsifier. For the behavior prevision of the treating fluid, the heating of the string has been calculated during the pumping, according to various flow rates.

The results are set forth below in Table 1.

TABLE 1

| Flow Rate | | Temperature (°C.) (a) | | | | |
|---|---|---|---|---|---|---|
| $m^3$/minute | bpm | 0 m | 100 m | 200 m | 300 m | 363 m |
| 0.08 | 0.5 | 25 | 27 | 29 | 33 | 38 |
| 0.16 | 1.0 | 25 | 26 | 27 | 29 | 30 |
| 0.24 | 1.5 | 25 | 25 | 26 | 27 | 28 |

(a) $T_o = 25°$ C.; $pH_o = 4.5$

The treating fluid expansion was equally checked, the expansion factor $f_e$ being calculated for 100% reaction. The results are listed in Table 2 below:

TABLE 2

| Pressure | | Expansion Factor ($m^3/m^3$) | | |
|---|---|---|---|---|
| kg/$cm^2$ | psia | 40° C. | 60° C. | 80° C. |
| 20.4 | 300 | 3.08 | 3.23 | 3.36 |
| 34.0 | 500 | 2.24 | 2.33 | 2.42 |
| 47.6 | 700 | 1.89 | 1.95 | 2.01 |

For the various reaction factors, the maximum temperature of the treating fluid was determined, obtained under equilibrium with the rock reservoir. Table 3 below illustrates the results.

TABLE 3

| Reaction Factor | Maximum Temperature (°C.) | | |
|---|---|---|---|
| % | $f_c = 1.5$ | $f_c = 2.5$ | $f_c = 3.5$ |
| 0 | 34.0 | 34.0 | 34.0 |
| 50 | 49.2 | 45.3 | 43.4 |
| 100 | 63.1 | 54.4 | 50.2 |

Penetration radius for h=9.7 m, $\phi$=21%, P=300 psia, T=50° C. and $f_e$=3.15 was calculated for the various reaction factors. Figures are listed below in Table 4.

TABLE 4

| Reaction Factor | Fluid Volume + $N_2$ | | Penetration Radius |
|---|---|---|---|
| % Reaction | $m^3$ | $bbl^2$ | m |
| 0 | 13.5 | 85.0 | 1.54 |
| 25 | 23.2 | 146.0 | 1.90 |
| 50 | 31.3 | 197.1 | 2.21 |
| 75 | 39.4 | 248.2 | 2.48 |
| 100 | 47.6 | 299.2 | 2.73 |

In the field, the present invention finds use in the dewaxing of producing intervals showing a high content of paraffinic damage, for example, in Brazil, at the Sergi formation, Dom Joao Field, Bahia, where two negative features can be encountered: paraffinic oil and low temperatures in the reservoir. Therefore, the synergistic combination of the thermal and chemical effects of the NGS/Emulsion should be specially well adapted to this case. A well of the Dom Joao field typically shows a paraffin content of nearly 28%, pour point 33° C. and cloud point 40° C., which means a rather advanced degree of paraffinic damage, since the paraffinic content is well above 10%, which empirically determines the range of large precipitation potential. Also, the cloud point is higher than the reservoir temperature, situated between 34° and 38° C., while the pour point is near the reservoir conditions. Laboratory experiments on the flow in a porous medium show the occurrence of paraffin precipitation within the rock, which negatively influences the flow within the system. Thus, the more paraffinic fractions could not be produced under normal production conditions. However, by the injection of a heat pulse in a paraffinic damage-containing well there is obtained a gain in production just after the heating of the well, as well as a modification in the rheological properties of the produced oil, where the paraffin content, pour point and cloud point are higher than those of the normally produced oil. In order to heat the reservoir around the well, the chosen process should present a reasonable thermal penetration in order to dissolve a non-superficial damage, besides being of practical implementation and low cost. This is the case of the process of the present invention, which combines the thermal and chemical solvents action, the oil pour point being consequently reduced.

The following Examples illustrate the invention, although they should not be construed as a limitation thereof.

EXAMPLES 1, 2 and 3

These Examples illustrate the dewaxing process of the present invention as applied to a well from the Dom Joao Field, Bahia, Brazil. The dewaxing operation program working out was based on the characterization of the oil and water produced, on the treating fluid (NGS/Emulsion) composition and on mathematical models applied to the prevision of treatment performance.

In the characterization of the produced oil in a well designed as DJ-100, thermal and rheological flowability and solubility characteristics have been considered. Test results are employed in the selection of a solvent adequate do act on the fluid as a solvent for the oil heavy fraction (paraffin). Table 5 lists the chemical characterization of the referred to oil.

TABLE 5

| API degree | 36 |
|---|---|
| Paraffin (%) | 28 |
| Asphaltenes (wt %) | 1 to 5 |
| BSW (%) | 80 |

In the study of the rheological behavior of the oil produced by this well, the paraffination critical temperature is traced by the trend of the consistency index and the behavior index, which are parameters belonging to the "POWER LAW" oil rheology, and not through the viscosity behavior, according to Table 6. The listed properties were obtained with the aid of a Brookfiled Viscometer with Thermosel SC-34.

TABLE 6

| Temp. °C. | Apparent Viscosity (cP) | | | | Behavior Index | Consistency Index |
|---|---|---|---|---|---|---|
| | 5/s | 10/s | 50/s | 100/s | | |
| 30 | 6880 | 4380 | — | — | 0.35 | 196 |
| 33 | 5690 | 4260 | — | — | 0.58 | 112 |
| 36 | — | 1670 | 905 | — | 0.62 | 40 |
| 40 | — | 530 | 390 | — | 0.81 | 8.2 |
| 45 | — | — | 330 | 290 | 0.84 | 6.2 |
| 50 | — | — | 260 | 235 | 0.87 | 4.3 |

Data of oil solubilities in organic solvents are listed in Table 7 below.

TABLE 7

| Solvent/Oil Ratio | Pour Point (°C.) | | |
|---|---|---|---|
| (vol/vol) | Diesel | Xylene | Diesel/Xylene (1/1) |
| 0 | 33 | 33 | 33 |
| 0.1 | 31 | 31 | 30 |
| 0.2 | 29 | 30 | 28 |
| 0.5 | 26 | 27 | 22 |
| 1.0 | 24 | 25 | 17 |

The selection of the solvent mixture is made on the basis of the solvent/paraffin mixture pour point evaluation tests. The best solvent is that which shows the higher reduction in the paraffin pour point.

Thus, Examples 1 to 3 illustrate how the dewaxing process of the present invention is applied to a Dom Joao Field well.

According to the foregoing, in order to effect the dewaxing process on the well, three formulations of the NGS/Emulsion fluid were prepared. The corresponding formulations are set forth in Table 8 below.

TABLE 8

| Components | Formulation (% volume) | | |
|---|---|---|---|
| | Example 1 | Example 2 | Example 3 |
| $NH_4Cl$ solution (a) | 35 | 30 | 25 |
| $NaNO_2$ solution (b) | 35 | 30 | 25 |
| Xylene | 15 | 20 | 25 |
| Diesel | 15 | 20 | 25 |
| Emulsifier (c) | 1 | 1 | 1 |

TABLE 8-continued

| Components | Formulation (% volume) | | |
|---|---|---|---|
| | Example 1 | Example 2 | Example 3 |
| Acetic Acid 96% | 0.3 | 0.3 | 0.3 |

(a) 26.75 wt % solution, 5M
(b) 34.50 wt % solution, 5M
(c) commercially available product ATPED 200 based on a sorbitan ester.

For each formulation the fluid properties were determined, according to data set forth in Table 9 below.

TABLE 9

| Properties | Formulation (% volume) | | |
|---|---|---|---|
| | NGS/E-1 | NGS/E-2 | NGS/E-3 |
| Reagents conc. (a) (mol/l) | 1.75 | 1.50 | 1.25 |
| NGS/Solvent Ratio (vol/vol) | 70/30 | 60/40 | 50/50 |
| Mixture $pH_o$ | 4.54 | 4.31 | 4.56 |
| Misture $pH_f$ | 5.98 | 5.47 | 5.76 |
| Density$_o$ (g/cm$^3$) | 1.035 | 1.021 | 1.018 |
| Half-life Period (b,c) (min) | 57 | 25 | 23 |
| Temp. at $T_{\frac{1}{2}}$(b) (°C.) | 81 | 80 | 69 |
| Max. Temperature (b) (°C.) | 91 | 90 | 83 |
| Length of time for max. T (b) (min) | 69 | 35 | 38 |
| Reaction Yield (b,d) (% REA) | 62 | 65 | 78 |
| Thermal Capacity (e) (kcal/l) | 131.2 | 112.5 | 93.7 |
| N$_2$ Capacity (e) (l N$_2$/l) | 39.2 | 33.6 | 28.0 |
| Reaction Constant (f) A | 0.2203 | 3.5450 | 1.7435 |
| Reaction Constant (f) B | −8811.5 | −7660.0 | −8940.4 |

(a) NH$_4$Cl and NaNO$_2$ molar concentration in the emulsion.
(b) paramenters as determined in a semi-adiabatic condition test.
(c) half-life period, considered as the time required for the generation, by the reaction medium, of half the nitrogen volume, stoichiometrically calculated as a function of the reagents concentration.
(d) reaction yield relates to N$_2$ percentage produced after test completion vs. calculated volume for each formulation.
(e) parameter calculated for the reaction calculated yield = 100%.
(f) specific reaction constants for each formulation, which defines the reaction constant K, where K = A + B/T.

When the fluid of Example 1 is used in a Dom Joao Field well, as set forth above, production rises from 14 m$^3$ oil per day to up to 40 m$^3$ oil per day after 30 days working of the fluid to the well. Production is stabilized at 30-35 m$^3$ oil per day for 60 days, the well pumping unit being thereafter changed, since it was under-sized to withdraw the huge oil volume produced. When the pump was exchanged for a more powerful engine, production stabilized at 72 m$^3$ oil per day, this level being kept as such for more than 90 days without any sign of production reduction.

The cost of a standard dewaxing operation is circa 40 days of oil production (time for investment recovery), which means that economically, the present process is highly interesting, in view of the practically complete removal of the paraffinic damage and maintenance of high oil production for extended periods of time.

We claim:

1. A process for the dewaxing of producing formations by means of a water-in-oil nitrogen generating emulsion system, which comprises the steps of:
   a) preparing an aqueous solution of NH$_4$Cl having a concentration of from 4.0 to 6.0M;
   b) preparing an aqueous solution of NaNO$_2$ having a concentration of from 5.0 to 9.0M;
   c) preparing an organic solvent mixture to achieve the hot dissolution of the paraffinic damage;
   d) adding an emulsifier to the organic solvents mixture so that the concentration of emulsifier in the mixture comprises between 0.5 to 2.0%;
   e) adding acetic acid 96% to the NH$_4$Cl solution;
   f) adding 50% of the emulsified organic solvents mixture of step d) to the NH$_4$Cl and 50% of the mixture to the NaNO$_2$ solution obtaining thus a NH$_4$Cl emulsion and a NaNO$_2$ emulsion respectively, both emulsions being kept under agitation;
   g) pumping simultaneously into the well the NH$_4$Cl and NaNO$_2$ emulsions, forming a mixture of equimolar NH$_4$Cl and NaNO$_2$ amounts thus initiating an equimolar reaction between the components mixture, this mixture producing nitrogen and heat, while pH is kept between 4.5 and 5.8; and
   h) after the pumping of the treating fluid, displacing it from the well by means of an overflush with an aqueous saline fluid.

2. A process for the dewaxing of producing formations according to claim 1, wherein the organic solvents mixture of step c) is made up of an aliphatic organic solvent and an aromatic organic solvent.

3. A process for the dewaxing of producing formations according to claim 1, wherein the organic solvent mixture of step c) is kerosene/xylene in the ratio of 1.2/1 by volume.

4. A process for the dewaxing of producing formations according to claim 1, wherein the organic solvents mixture is made up of diesel oil/xylene in the ratio of 1/1 by volume.

5. A process for the dewaxing of producing formations according to claim 1, wherein in step f) the mixture of organic solvents and NH$_4$Cl and NaNO$_2$ emulsions contains of from 30% to 50% of the whole organic solvents volume.

6. A process for the dewaxing of producing formations according to claim 1, wherein in the amount of acetic acid relative to the total volume of the Nitrogen Generating System Emulsion comprises between 0.2 and 0.4% while the emulsifying agent comprises between 0.2 and 1.0% of the total volume.

7. A process for the dewaxing of producing formations according to claim 1, wherein the emulsifying agent is a non-ionic lipophilic agent.

8. A process for the dewaxing of producing formations according to claim 1, wherein the emulsifying agent a non ionic lipophilic agent is a sorbitan ester.

* * * * *

UNITED STATES PATENT AND TRADEMARK OFFICE
CERTIFICATE OF CORRECTION

PATENT NO. : 5,183,581
DATED : February 2, 1993
INVENTOR(S) : Khalil, et. al.

It is certified that error appears in the above-indentified patent and that said Letters Patent is hereby corrected as shown below:

Column 10, Claim 1, lines 10 & 14 delete "solvents" and insert --solvent--.
Claim 1, line 2, delete $NH_4Cl$ and insert --$NH_4Cl$ solution--.
Claim 5, line 43, delete "contains of" and insert --contains--.
Claim 8, line 2, delete "claim 1" and insert --claim 7--.
delete "emulsifying agent a"--.

Signed and Sealed this

Fifteenth Day of March, 1994

Attest:

BRUCE LEHMAN

Attesting Officer

Commissioner of Patents and Trademarks